United States Patent [19]
Foss et al.

[11] Patent Number: 5,619,608
[45] Date of Patent: Apr. 8, 1997

[54] OPTICAL FIBRE SPLICE ENCLOSURES

[75] Inventors: Raymond C. Foss; Andrew S. Cammack, both of Plymouth, England

[73] Assignee: Bowthorpe PLC, United Kingdom

[21] Appl. No.: 501,081

[22] PCT Filed: Feb. 4, 1994

[86] PCT No.: PCT/GB94/00217

§ 371 Date: Aug. 1, 1995

§ 102(e) Date: Aug. 1, 1995

[87] PCT Pub. No.: WO94/18590

PCT Pub. Date: Aug. 18, 1994

[30] Foreign Application Priority Data

Feb. 4, 1993 [GB] United Kingdom ............... 9302199

[51] Int. Cl.[6] ............... G02B 6/26; B65D 1/34
[52] U.S. Cl. ............... 385/135; 385/137; 206/557; 206/558; 206/564; 206/565
[58] Field of Search ............... 385/134, 135, 385/136, 137; 206/316.1, 472, 473, 557, 558, 560, 564, 565

[56] References Cited

U.S. PATENT DOCUMENTS 4,886,336  12/1989  Duesser et al. ............... 385/135 X

FOREIGN PATENT DOCUMENTS

| 0215668 | 9/1986 | European Pat. Off. | 385/135 X |
| 0531628 | 6/1992 | European Pat. Off. | 385/135 X |
| 2165661 | 7/1985 | United Kingdom | 385/135 X |
| PCT/US90/02295 | 4/1990 | WIPO | 385/135 X |

Primary Examiner—Brian Healy
Attorney, Agent, or Firm—David P. Gordon

[57] ABSTRACT

An enclosure assembly for optical fibre splices or other optical fibre components comprises a plurality of trays disposed in a stack with the trays inclined at a common angle to a longitudinal axis of the stack. Each tray is of generally elliptical shape in plan and is pivotally mounted, adjacent one end of its major axis, to an upright support.

18 Claims, 4 Drawing Sheets

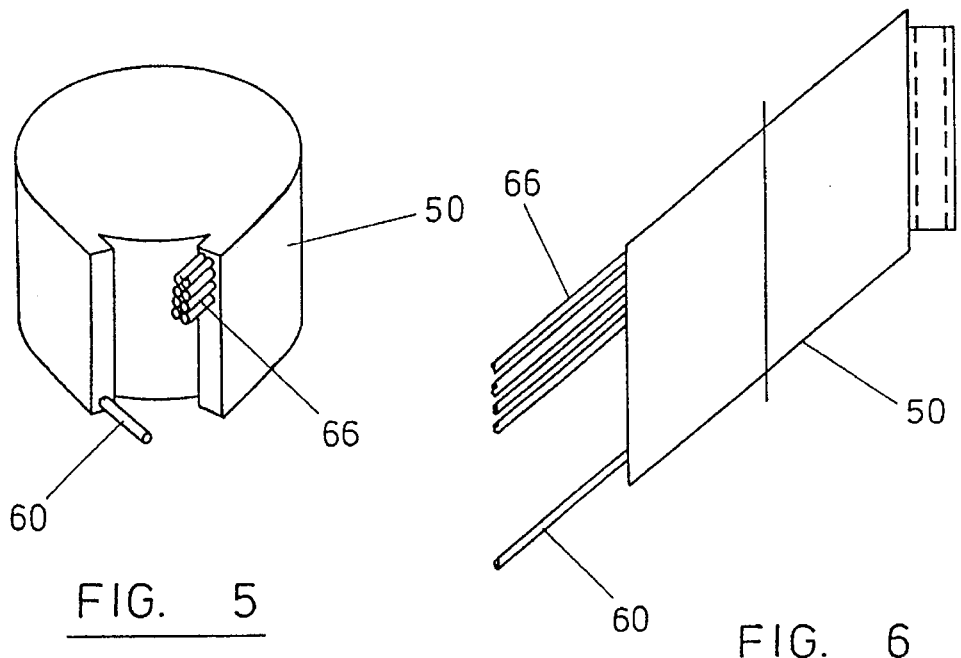
FIG. 5
FIG. 6
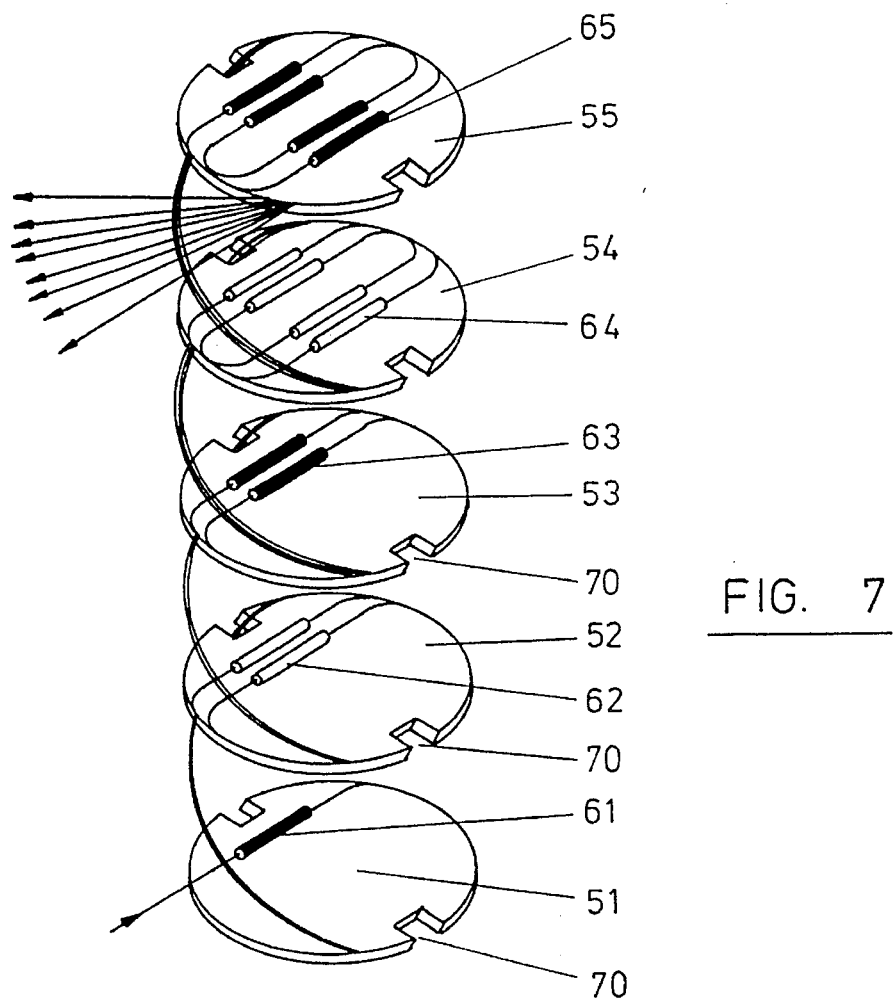
FIG. 7

OPTICAL FIBRE SPLICE ENCLOSURES

BACKGROUND OF THE INVENTION

This invention relates to optical fibre splice enclosures.

It is often desirable for optical fibre splice enclosures to occupy minimum space, yet the fibres entering and leaving the enclosure must not be bent to radii smaller than a predetermined minimum.

SUMMARY OF THE INVENTION

In accordance with this invention as seen from one aspect, there is provided an enclosure assembly for optical fibre splices or other optical fibre components, the assembly comprising a plurality of trays disposed in a stack with the trays inclined at a common angle to a longitudinal axis of the stack, each tray being of generally elliptical shape in plan and being pivotally mounted, adjacent one end of its major axis, to an upright support.

Because the elliptical trays are longer in one dimension than if they were circular, they can accommodate splices or other components of relatively long length, as becomes necessary if the overall size of the enclosure and its trays has to be reduced. However, the elliptical trays still project a generally circular "footprint", so that the stack of trays fits closely within a cylindrical cover when applied over the stack.

Preferably each tray has at least one opening formed in its floor and open to its periphery, enabling fibres to pass from one tray to the next tray along a circumferential path. Preferably this opening in each tray is adjacent its point of pivotal mounting to the upright support: then the adjacent trays can be pivoted away from each other, or they can be pivoted together, without stressing the fibres passing between the trays.

Preferably each tray has at least one fibre entry adjacent its point of pivotal mounting to the upright support, and also at least one fibre entry adjacent its opposite end. Preferably the enclosure enables the trays to rest in a downwardly inclined orientation, but enables the trays to be held, alternatively, in an upwardly inclined orientation: in the first case fibres may enter the trays from their outer or front ends, and in the second case the fibres may instead enter the trays from their pivoted or rear ends.

The enclosure assembly may be used for fibre splitting or combining. Presently, passive optical fibre splitters are available in various split level, typically 1×2 and 1×6. Often higher split levels are required and are achieved by cascading several 1×2 and 1×6 splitters. These splitters are normally housed in several splice trays, together with their associated protected splices (which are required to link each splitter to the next splitter). It will be appreciated that the splitters can be used, in the opposite sense, as combiners (i.e. feeding the signals from several fibres into single fibre). Owing to the large number of components needed for high split or combining levels, several splice trays have to be used. The interconnection of optical fibres between these several trays presents considerable problems in managing the fibres, including routing them between trays whilst maintaining a safe minimum bend radius for the fibres.

In accordance with this invention, there is provided an enclosure assembly for optical fibre splices and splitter or combiner components, comprising a plurality of trays disposed in a stack, alternate trays retaining optical fibre splices and optical fibre splitters or combiners, with the optical fibres following a circumferential path from each tray to the next tray in the stack.

Preferably each tray has at least one opening formed in its floor through which a fibre runs in passing from one tray to the next. The assembly may be formed as a module which comprises a tubular housing which contains the stack of trays.

Embodiments of this invention will now be described by way of examples only and with reference to the accompanying drawings.

BRIEF DESCRIPTION OF THE DRAWINGS

FIG. 5 is a schematic front view of an optical fibre splitter or combiner module;

FIG. 6 is a side view of the module of FIG. 5; and

FIG. 7 is a schematic exploded view of a stack of trays within the module of FIGS. 5 and 6.

DETAILED DESCRIPTION OF THE PREFERRED EMBODIMENTS

Figure 1:
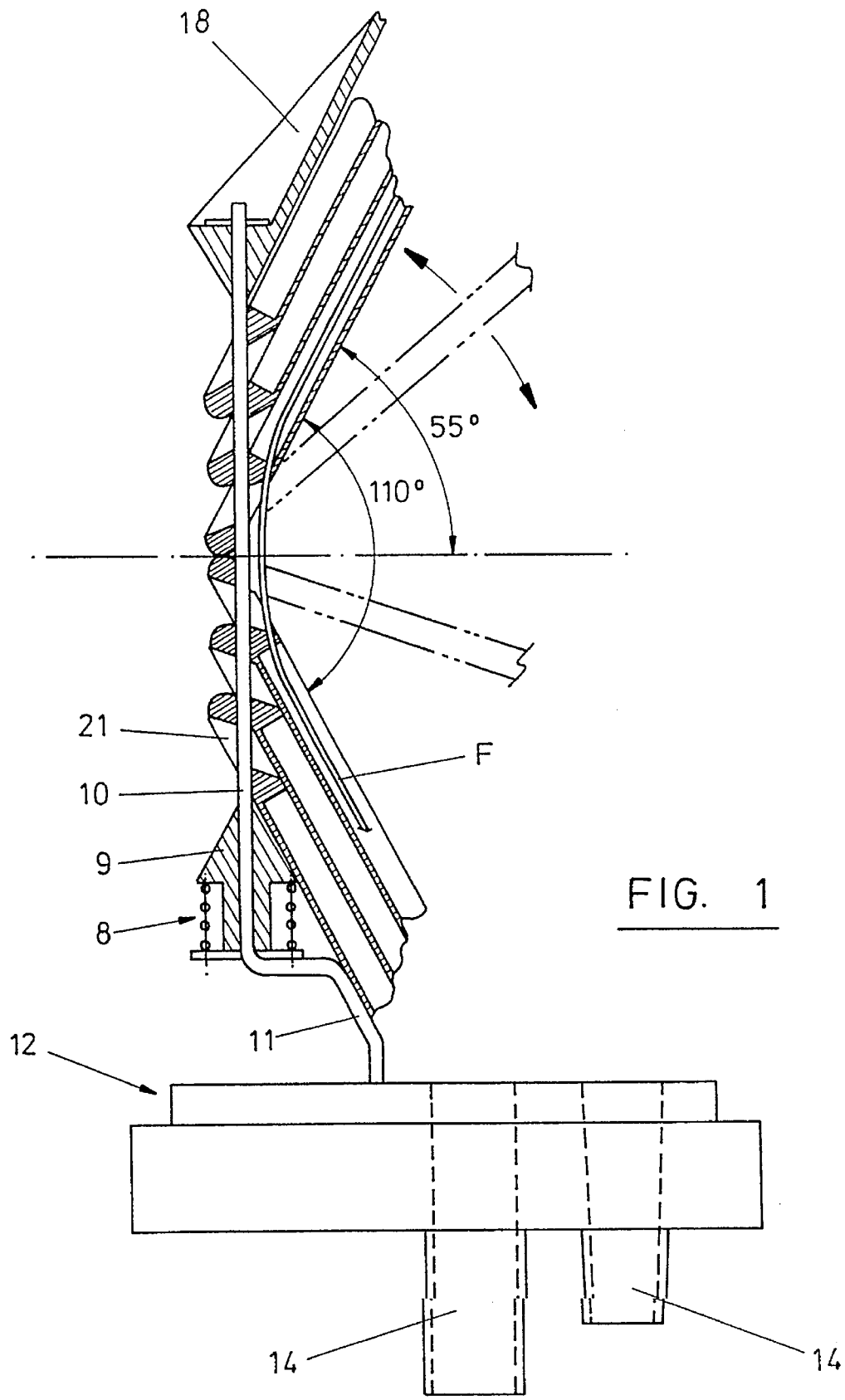
FIG. 1 is a side elevation, partly in section, of an enclosure shown with its tubular cover removed.

FIG. 1 shows the internal components of an enclosure for optical fibre splices. A backbone 10, in the form of a rectangular-section strip of metal, projects upwards from a base 12 which is formed with a number of tubular cable entry ports 14 projecting from its underside. A plurality of trays 20 are pivotally coupled to the backbone 10, in that each tray is formed with an aperture 21 adjacent its edge, through which the backbone extends. A stop 18 is mounted to the top of the backbone 10, and projects from the backbone in a forwards direction, and also in an inclined upwards direction of e.g. 55° to the horizontal. An abutment member 9 is slidably mounted on the backbone 10 at its lower end, and is lightly urged upwards and against the stack of trays 20, by a spring 8: the abutment member 9 has an inclined top surface and the stack of trays are able to rest partly on this and partly on an inclined portion 11 of the backbone, the trays then resting at a downwardly inclined angle of e.g. 55°. It will be appreciated therefore that the trays can be pivoted through up to 110° between a downwardly inclined position (shown for the bottom few trays) and an upwardly inclined position (shown for the top few trays). The enclosure is completed by a cylindrical cover member (not shown) which is closed at its upper end and can be placed over the assembly of pivotally mounted trays, for its open bottom end to sit on the base 12.

Figure 2:
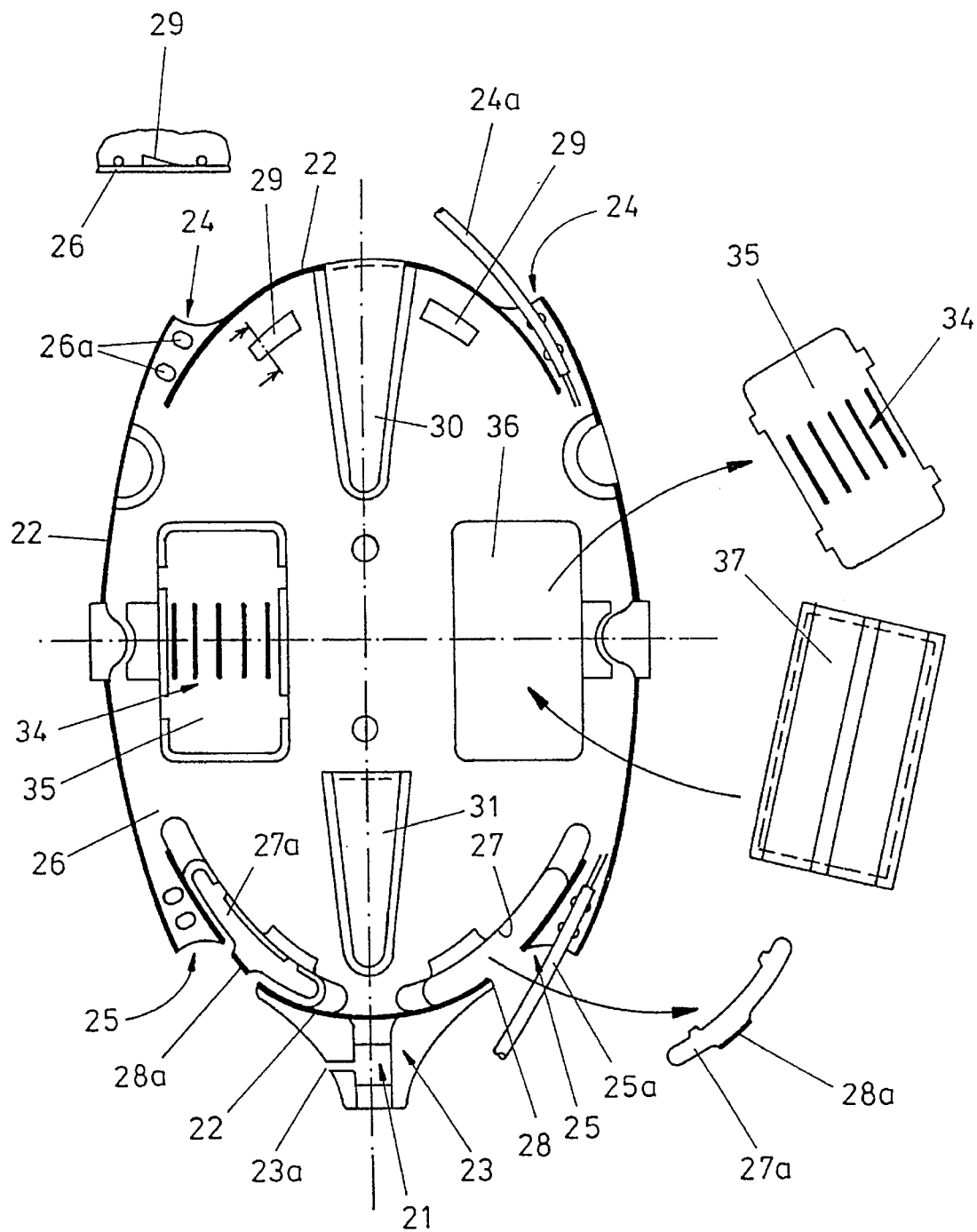
FIG. 2 is a plan view of one of the trays used in the assembly of FIG. 1.

FIG. 2 shown one of the trays 20 in detail. Thus, each tray is of generally elliptical shape in plan view and has a flat floor 26 and an upstanding peripheral wall 22. A projection 23 at one end (the rear end) of the tray is formed with the aperture 21 which serves for pivotally mounting the tray to the backbone 10 of the enclosure. A slot 23a is provided to enable the tray to be engaged and disengaged with the backbone 10 by a sideways movement. Adjacent its opposite end (forward end), the peripheral wall is formed to provide two tangential fibre entries 24, one either side of the major axis of the tray: at the rear end of the tray, the peripheral wall is similarly formed with two tangential fibre entries 25. Also adjacent the rear end of the tray, the floor 26 of the tray is formed with two elongate windows 27, one either side of the major axis of the tray and each immediately adjacent the peripheral wall: further, the peripheral wall is formed with an aperture 28 to provide a free opening into each window 27. It will be noted that each window 27 is initially closed by an element 27, which also includes a tab 28a closing the wall opening 28: each element 27a is frangibly connected to the tray floor 26 and can be broken away when required, as shown.

Optical fibres can enter or leave the tray through any of the tangential entries 24,25, or through the windows 27, as will be described below. However, FIG. 2 shows fibres contained within flexible tubes 24a and 25a passing into the entries 24 and 25: any such fibres or tubes may be held by ties passed around them and through holes 26a in the tray floor. Within the tray, the optical fibres follow curved paths adjacent the peripheral wall 22: the floor of the tray is formed with ramp-section projecting lugs e.g. 29 spaced inwardly from the peripheral wall, to inhibit the fibres moving radially inwards. An elongate tab 30 projects radially inwardly from the top of the peripheral wall 22 and parallel to the tray floor, at the front end of the tray, and a similar tab 31 projects up from the floor and then radially outwards towards the rear end of the tray: the optical fibres run underneath these tabs and are prevented by these tabs from lifting out of the open top of the tray.

Two sets of parallel ribs 34 are formed on the floor of the tray, these two sets of ribs being spaced-apart along the minor axis of the tray and symmetrically-positioned either side of the major axis of the tray: the ribs run parallel to the major axis of the tray, and serve to retain optical fibre splices or other components when inserted between adjacent such ribs. Each set of ribs is formed on a portion 35 of the floor, this portion being frangibly connected to the remainder of the floor. Thus, and as shown, each of these portions 35 can be broken away to leave an open window 36 (rectangular in shape in the example shown). A replacement pad 37 may be snap-fitted into this window, the replacement pad 37 being formed with a fewer number of wider-spaced ribs, to retain splices or other components of wider dimensions.

It will be appreciated that because the tray 20 is generally elliptical, it can accommodate longer splices (or other components) at the designated positions, than if the tray were circular. However, when the stack of trays is disposed in an inclined rest position as shown in FIG. 1, they project a generally circular "footprint" onto the base 12: accordingly, the stack of trays fit closely within a circular-section tubular cover, when the latter is fitted.

Figure 3:
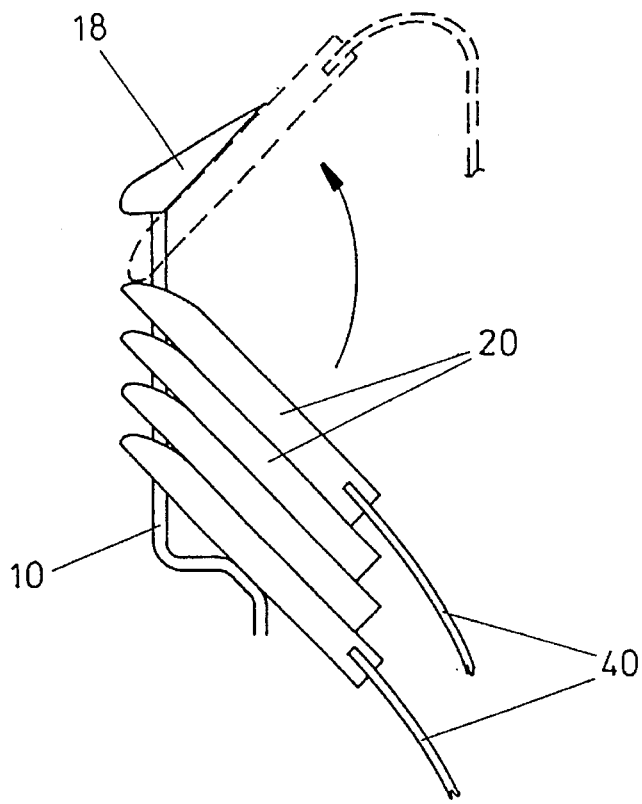
FIG. 3 is a diagrammatic side view of the stack of trays, shown resting in a downwardly inclined orientation.
Figure 4:
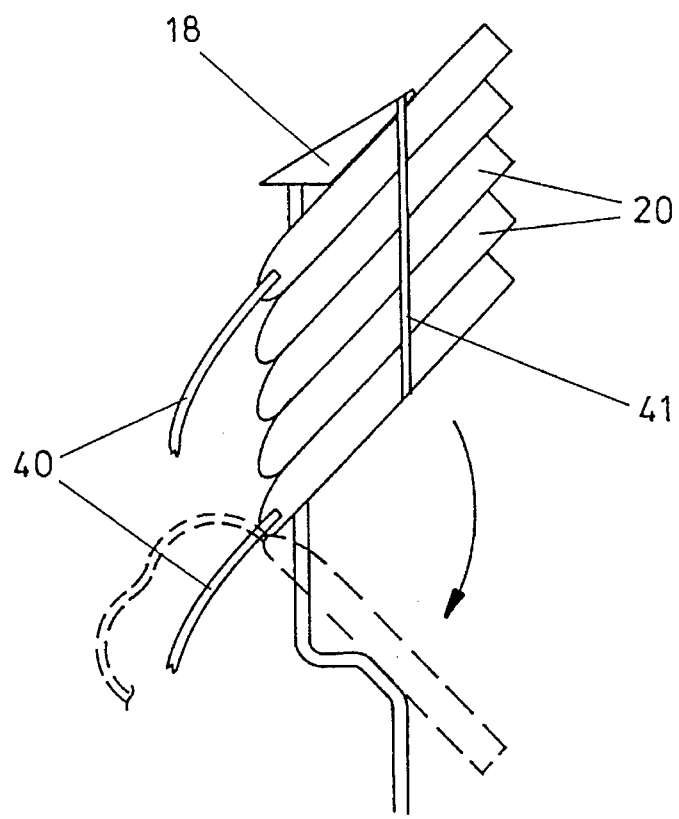
FIG. 4 is a similar view of the stack of trays shown when held in an upwardly inclined orientation.

The trays may be inclined downwardly as shown in FIG. 3, with optical fibres 40 entering the individual trays through their front entries 24. To provide access to any individual tray, either for installation or maintenance, the trays above the tray of interest can be pivoted upwards against the stop 18. Instead, the trays may be inclined upwardly as shown in FIG. 4, and held to the stop 18 by a tie or band 41 for example: in this case the optical fibres enter the individual trays through their rear entries 25. To provide access to any individual tray, that tray and any trays below it are pivoted downwardly as indicated.

The windows 27 in the floor 26 of each tray 20 enable fibres to pass directly from one tray to the next tray of the stack. Thus, one or more fibres may, after following their curved path within one tray, simply pass up through a window 27 of the next tray above, and follow the usual curved path within that next tray: in passing from one tray to the next, the fibre or fibres simply continue to follow their usual curved path without any significant change of direction. It will be appreciated that because of the positions of the windows 27 adjacent the pivotal mounting of the trays 20 to the backbone 10, the trays can still be pivoted relative to the backbone, without applying any significant stress to any optical fibres which run from one tray to the next via the windows 27: such a fibre is shown at F in FIG. 1. It will further be appreciated that the openings 28 in the peripheral wall 22 enable optical fibres to be inserted into the windows 27 by a simple sideways movement of the fibres.

A particular use of the windows is where a fibre enters a first tray and passes to a splitter in that tray, then the two (or more) fibres from that splitter pass to a second tray in the stack, where they are spliced to a corresponding number of fibres which then pass to a corresponding number of splitters in a third tray, and so on. Thus through a succession of trays in a stack, a single fibre entering a first tray can be split into a large number of outgoing fibres. Instead of housing splitters, the alternate trays may house combiners, so that a plurality of incoming fibres may be combined into a single outgoing fibre.

Referring to FIGS. 5 to 7, there is shown an optical fibres splitter module comprising a tubular housing 50 which contains a stack of flat, generally circular trays 51 to 55. The trays 51 to 55 are stacked one-upon-another, with the planes of the trays at an acute angle, preferably between 35° and 45°, to the longitudinal axis of the stack and of the housing 50: the top and bottom walls of the housing are similarly inclined to its longitudinal axis and the housing is elliptical in cross-section to fit closely around the stack of inclined trays. Alternatively the trays may be generally elliptical and the housing 50 circular in section.

In the example shown, a single fibre enters the housing 50 through an inlet tube 60 and passes to a 1×2 splitter 61 mounted on the bottom or first tray 51. The two fibres from this splitter pass to splices 62, on the second tray 52. The two fibres from the splices 62 pass to respective 1×2 splitters 63 on the third tray 53: the four fibres from these splitters pass to respective splices 64 on the fourth tray 54. The fibres from the splices 64 pass to four 1×2 splitters 65 on the fifth or top tray 55. The fibres from the splitters 65 leave the module through outlet tubes 66.

It will be noted that the fibres pass from each tray to the next tray above along circumferential paths of radii greater than the minimum bending radius of the fibres, and pass through notches 70 in the edge of the next tray above. Preferably as shown the splices and splitters are engaged with their respective trays (e.g. as an interference fit into a groove or between a pair of ridges in each case) with the splices and splitters oriented parallel to each other. It will also be noted that the fibres enter and leave the module along paths tangential to the module. FIG. 7 is diagrammatic and in practice each tray preferably has an upstanding peripheral wall.

The module of FIGS. 5 to 7 may be installed in the enclosure of FIG. 1, in place of several of the trays 20. For this purpose preferably the module housing 50 has one or more apertured projections e.g. 56 on its outer surface, diametrically opposite the tangential inlet and outlets 60, 66, for engagement with the backbone 10 of the enclosure of FIG. 1. The module may instead be used as a combiner module, with combiners instead of splitters in the alternate trays.

We claim:

1. An enclosure assembly for optical fibre splices or other optical fibre components, the assembly comprising a plurality of trays disposed in a stack with the trays inclined at a common angle to a longitudinal axis of the stack, each tray being of generally elliptical shape in plan and being pivotally mounted, adjacent one end of its major axis, to an upright support.

2. An enclosure assembly as claimed in claim 1, in which each tray has one or more openings formed in its floor and open to its periphery, to enable one or more optical fibres to pass from one tray to the adjacent tray along a path tangential to the two trays.

3. An enclosure assembly as claimed in claim 2, in which said opening is positioned adjacent the pivotal mounting of the tray to said support.

4. An enclosure assembly as claimed in claim 2, in which each said opening is closed by an element frangibly connected to its tray.

5. An enclosure assembly as claimed in claim 1, in which each tray has an upstanding peripheral wall which is formed with one or more fibre entries adjacent said one end of its major axis and/or adjacent the opposite end of its major axis, with at least one entry for optical fibres.

6. An enclosure assembly as claimed in claim 1, in which each tray has a least one portion of its floor provided with means for retaining optical fibre splices or other optical fibre components, said portion being frangibly connected to said floor and replaceable by alternative retaining means.

7. An enclosure assembly as claimed in claim 1, comprising means enabling said trays to rest in downwardly inclined orientation and means for holding said trays, alternatively, in upwards inclined orientation.

8. An enclosure assembly for optical fibre splices or other optical fibre components, the assembly comprising a plurality of trays disposed in a stack, each tray having at least one opening formed in its floor and open to its periphery, to enable one or more optical fibres to pass from one tray to the adjacent tray along a path tangential to the two trays.

9. An enclosure assembly as claimed in claim 8, in which said opening is positioned adjacent the pivotal mounting point of the tray to said support.

10. An enclosure assembly as claimed in claim 8, in which each said opening is closed by an element frangibly connected to its tray.

11. An enclosure assembly as claimed in claim 8, in which each tray has an upstanding peripheral wall which is formed with one or more fibre entries adjacent its said mounting point and/or adjacent a diametrically opposite point, with at least one entry for optical fibres.

12. An enclosure assembly as claimed in claim 8, in which east tray has at least one portion of its floor provided with means for retaining optical fibre splices or other optical fibre components, said portion being frangibly connected to said floor and replaceable by alternative retaining means.

13. An enclosure assembly as claimed in claim 8, comprising means enabling said trays to rest in downwardly inclined orientation and means for holding said trays, alternatively, in upwards inclined orientation.

14. An enclosure assembly for optical fibre splices or other optical fibre components, the assembly comprising a plurality of trays disposed in a stack, each tray being slidably and pivotally mounted to an upright support, means enabling said trays to rest in a downwardly inclined orientation and means for holding said trays, alternatively, in an upwardly inclined orientation.

15. An enclosure assembly for optical fibre splices and optical fibre components selected from splitter and combiner components, comprising a plurality of trays disposed in a stack, alternate trays retaining optical fibre splices and optical fibre components selected from splitters or combiners, with the optical fibres following a circumferential path from each tray to the next tray in the stack.

16. An enclosure assembly as claimed in claim 15, in which each tray has at least one opening formed in its floor and open to its periphery, through which a fibre runs in passing from each tray to the next tray.

17. An enclosure assembly as claimed in claim 15, in which each tray is of generally circular or generally elliptical shape in plan view.

18. An enclosure assembly as claimed claim 15, formed as a module which comprises a tubular housing which contains said plurality of trays.

* * * * *